United States Patent
Ohlig et al.

(10) Patent No.: US 9,850,970 B2
(45) Date of Patent: Dec. 26, 2017

(54) MOTOR VEHICLE BRAKE WHICH CAN BE ACTIVATED ELECTROMECHANICALLY AND HYDRAULICALLY AND HAS OPTIONAL SELF-LOCKING

(71) Applicant: Lucas Automotive GmbH, Koblenz (DE)

(72) Inventors: Benedikt Ohlig, Vallendar (DE); Gregor Poertzgen, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 15/039,872

(22) PCT Filed: Nov. 27, 2014

(86) PCT No.: PCT/EP2014/075802
§ 371 (c)(1),
(2) Date: May 27, 2016

(87) PCT Pub. No.: WO2015/082299
PCT Pub. Date: Jun. 11, 2015

(65) Prior Publication Data
US 2016/0377137 A1    Dec. 29, 2016

(30) Foreign Application Priority Data
Dec. 6, 2013  (DE) .......................... 10 2013 020 468

(51) Int. Cl.
*F16D 65/18*    (2006.01)
*B60T 13/74*    (2006.01)
(Continued)

(52) U.S. Cl.
CPC ............ *F16D 65/18* (2013.01); *B60T 13/741* (2013.01); *B60T 13/746* (2013.01);
(Continued)

(58) Field of Classification Search
CPC ...... F16F 65/18; B60T 13/746; B60T 13/741; F16D 2121/24; F16D 2125/48; F16D 2125/50; F16D 2125/40; F16D 2127/06
(Continued)

(56) References Cited

U.S. PATENT DOCUMENTS 6,305,508 B1   10/2001  Schumann
6,457,783 B1 *  10/2002  Schanzenbach ...... B60T 13/745
                                                      188/156

(Continued)

FOREIGN PATENT DOCUMENTS

DE    19750420 A1    5/1999
DE    19818157 A1   10/1999
(Continued)

OTHER PUBLICATIONS

German Search Report, Application No. 102013020468.2 dated Aug. 5, 2014.
(Continued)

*Primary Examiner* — Thomas J Williams
*Assistant Examiner* — Mariano Sy
(74) *Attorney, Agent, or Firm* — MacMillan, Sobanski & Todd, LLC

(57) ABSTRACT

A motor vehicle brake, in particular a motor vehicle brake which can be activated in a combined fashion both hydraulically and electromechanically, having an actuator assembly comprising a housing, an actuator element which can be moved relative to the housing in order to move a brake lining hydraulically or electromechanically, a motor-operated drive, a movement mechanism arranged between the motor-operated drive and the movable actuator element, a gear arrangement assigned to the movement mechanism, and a
(Continued)

separate self-locking device which is designed to block the movement mechanism when necessary and is integrated into the motor-operated drive.

9 Claims, 8 Drawing Sheets

(51) Int. Cl.
*F16D 121/24* (2012.01)
*F16D 125/40* (2012.01)
*F16D 125/50* (2012.01)
*F16D 127/06* (2012.01)
*F16D 125/48* (2012.01)

(52) U.S. Cl.
CPC ...... *F16D 2121/24* (2013.01); *F16D 2125/40* (2013.01); *F16D 2125/48* (2013.01); *F16D 2125/50* (2013.01); *F16D 2127/06* (2013.01)

(58) Field of Classification Search
USPC .................. 188/106 F, 156, 162, 71.9, 72.8
See application file for complete search history.

(56) References Cited

U.S. PATENT DOCUMENTS

| | | | | |
|---|---|---|---|---|
| 6,471,017 B1* | 10/2002 | Booz | .................. | F16D 55/02 188/162 |
| 6,774,595 B1* | 8/2004 | Laxhuber | ................ | B60T 13/74 303/20 |
| 7,066,304 B2* | 6/2006 | Severinsson | .......... | B60T 13/741 188/162 |
| 8,020,675 B2 | 9/2011 | Cao et al. | | |
| 8,051,957 B2* | 11/2011 | Giering | ................. | B60T 13/741 188/72.8 |
| 8,616,348 B2 | 12/2013 | Winkler et al. | | |
| 9,340,194 B2* | 5/2016 | Giering | ................. | B60T 13/741 |
| 2006/0144626 A1* | 7/2006 | Mizutani | .............. | B60K 7/0007 180/65.51 |
| 2007/0007817 A1* | 1/2007 | Nonaga | ................. | B60T 13/746 303/155 |
| 2009/0283371 A1* | 11/2009 | Winkler | .................. | F16D 65/18 188/72.6 |
| 2014/0166413 A1 | 6/2014 | Giering | | |
| 2016/0273602 A1* | 9/2016 | Poertzgen | ............. | B60T 13/588 |
| 2016/0377138 A1* | 12/2016 | Loens | .................... | F16D 65/18 188/106 F |

FOREIGN PATENT DOCUMENTS

| | | |
|---|---|---|
| DE | 10340250 A1 | 3/2005 |
| DE | 102012208294 A1 | 11/2012 |
| DE | 102011102860 A1 | 12/2012 |
| DE | 102011086152 A1 | 2/2013 |
| DE | 102011084190 A1 | 4/2013 |
| WO | 2007012515 A1 | 2/2007 |
| WO | 2008037738 A1 | 4/2008 |

OTHER PUBLICATIONS

PCT International Search Report and the Written Opinion, Application No. PCT/EP2014/075802 filed Nov. 27, 2014, dated Feb. 27, 2015.
PCT International Preliminary Report on Patentability, Application No. PCT/EP2014/075802 filed Nov. 27, 2014, dated Nov. 10, 2015.

* cited by examiner

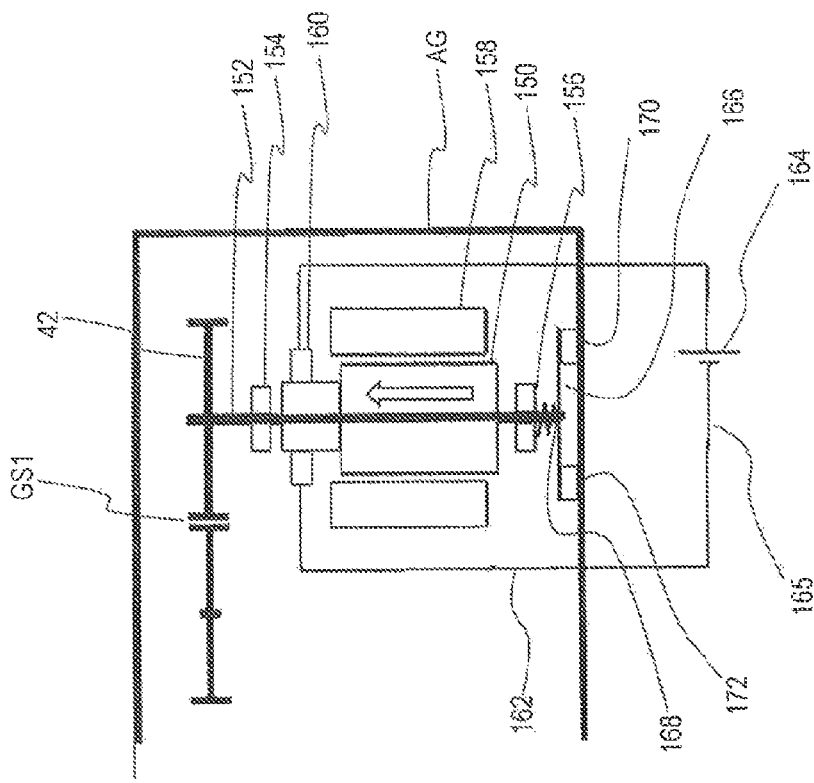
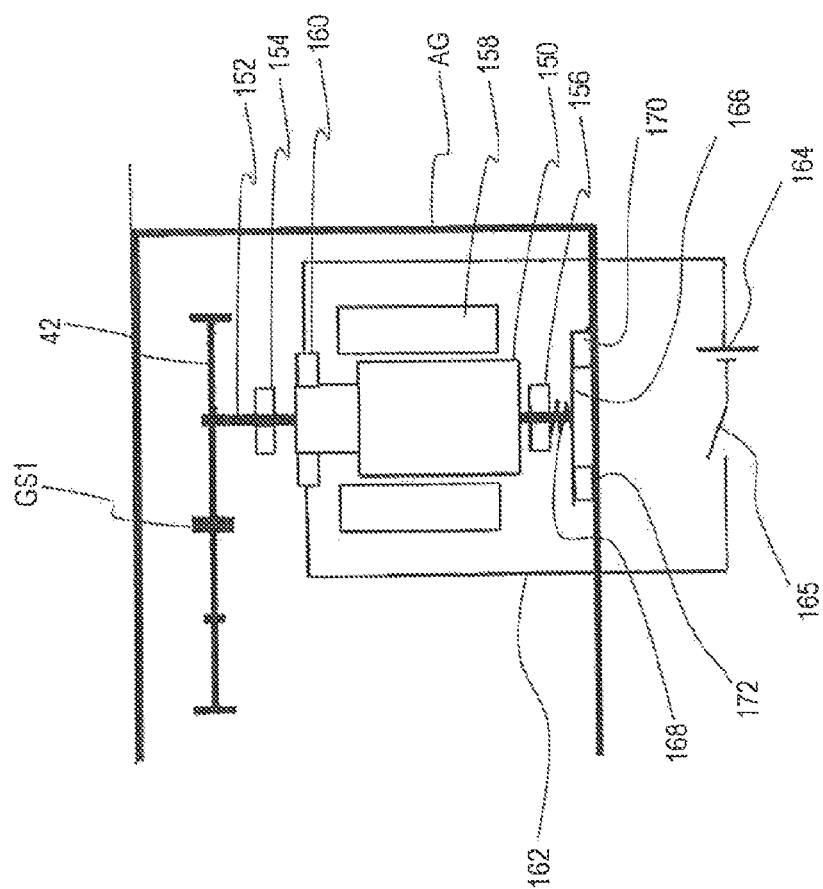

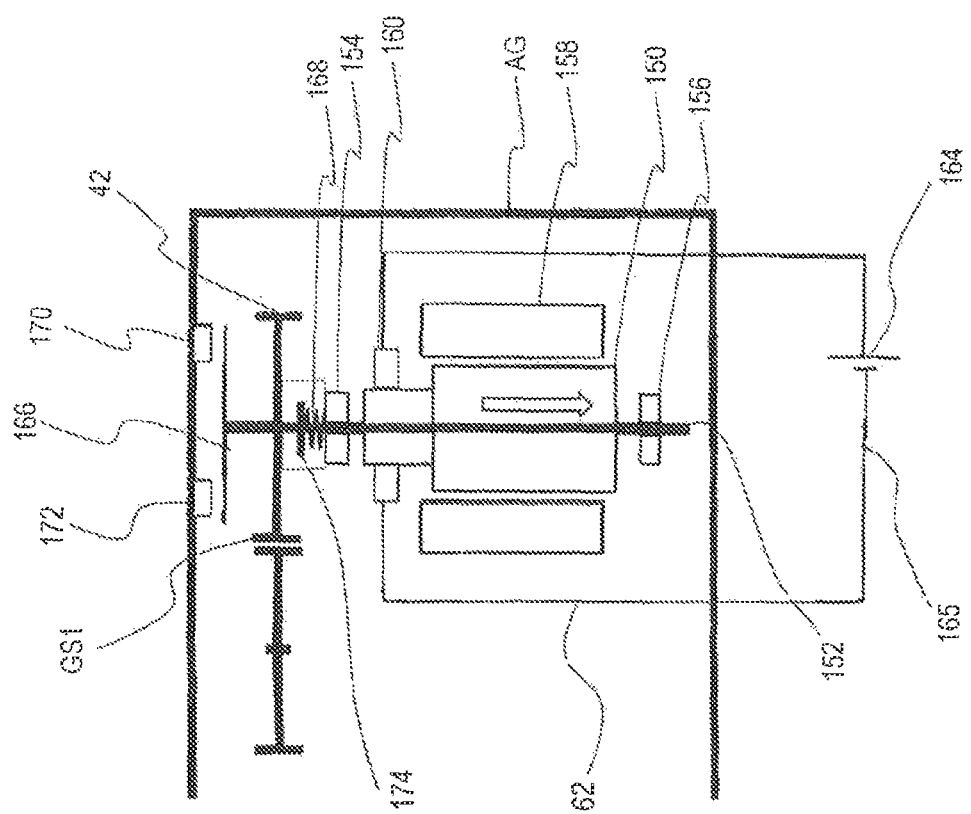
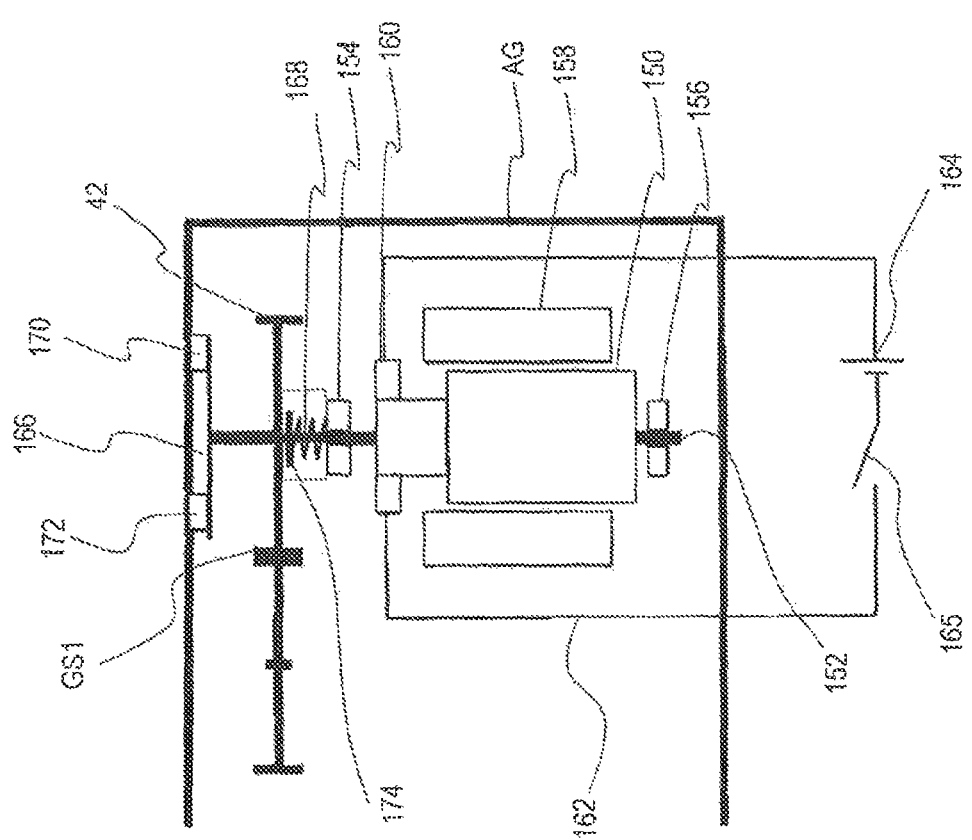

MOTOR VEHICLE BRAKE WHICH CAN BE ACTIVATED ELECTROMECHANICALLY AND HYDRAULICALLY AND HAS OPTIONAL SELF-LOCKING

CROSS-REFERENCE TO RELATED APPLICATIONS

This application is a national stage of International Application No. PCT/EP2014/075802 filed 27 Nov. 2014, the disclosures of which are incorporated herein by reference in entirety, and which claimed priority to German Patent Application No. 10 2013 020 468.2 filed 6 Dec. 2013, the disclosures of which are incorporated herein by reference in entirety.

BACKGROUND OF THE INVENTION

The invention relates to an electromechanically and hydraulically operable motor vehicle brake having an actuator assembly, comprising: a housing, an actuator element that is displaceable relative to the housing for hydraulic or electromechanical displacement of a brake lining, a motor drive, a displacement mechanism arranged between the motor drive and the displaceable actuator, gear arrangement assigned to the displacement mechanism and a separate self-locking device which is designed to lock the displacement mechanism as needed, wherein the displacement mechanism has a ball screw drive having a spindle and a nut, wherein the one component can optionally be driven rotationally by a spindle nut drive, and the other component can be displaced linearly inside the housing as a spindle nut for displacement of the actuator element by rotational drives of a component of the spindle nut.

For a long time, motor vehicle brakes have been in use, in which the brake linings are hydraulically displaced in the usual manner in the case of normal operational braking while driving the vehicle, but in which for activation of a parking brake function, an electromechanical displacement of the brake linings or at least an electromechanically triggered locking of the brake linings in a braking position takes place. Such motor vehicle brakes offer the advantage that the parking brake function can be activated or released more conveniently by simple operation of an activation switch.

Such electromechanically and hydraulically operable motor vehicle brakes are known from the state of the art.

The document WO 2008/037738 A1 thus describes a motor vehicle brake that can be operated both hydraulically and electromechanically. In a normal operational situation, i.e., while driving the vehicle, this motor vehicle brake is hydraulically operated in the usual way. However, for activation of a parking brake, the electromechanical operating function is activated. In doing so, an electric motor is triggered, driving a spindle nut arrangement via a displacement mechanism with a gear arrangement. The gear arrangement is designed to be self-locking with a worm gear to prevent the parking brake effect from being diminished when the parking brake is activated. However, the self-locking effect has the disadvantage that only very low degrees of efficiency can be achieved, so that the components, in particular the electric motor, must be designed to be relatively powerful and must have a high power consumption. It is true that the total efficiency of the system is comprised of the product of the individual efficiencies of the components. For example, efficiency is derived from the product of the efficiency of the motor, the efficiency of the downstream gear arrangement and the spindle nut arrangement. Thus, efficiencies in the range of only 30% and less can be achieved with gear arrangements having a self-locking effect.

The document DE 10 2012 208 294 A1 describes a motor vehicle brake in which a separate self-locking device is arranged directly on the nut-spindle assembly. Reference is made particular to FIG. 8 in this document, where it is shown that the self-locking device, which is designated as coupling device 41, is arranged between the rolling body ramp gear and the brake piston. Such a direct spatial correlation of the self-locking device with the spindle nut assembly and a ball screw drive has the disadvantage that the reactive forces occurring in activation of the brake and maintenance of a (parking) brake state must be absorbed by the self-locking device to the full extent. The self-locking device must be designed to be solid accordingly, as a result of which it takes up a substantial amount of space. Therefore, the brake must also be designed to be disproportionately large in the axial direction in particular with respect to the threaded spindle.

Furthermore, the document DE 10 2011 102 860 A1 discloses a motor vehicle brake that has been improved in comparison with this prior art, in which the self-locking device is arranged close to the spindle nut arrangement but is integrated into the gear arrangement, so that the installation space can be reduced in the axial direction with respect to the threaded spindle. This brake can be designed to be more compact.

The document DE 10 340 250 A1 describes an electric parking brake for a motor vehicle comprising a first electric drive. The first electric drive serves to switch the parking brake between an active position and a released position. To improve the efficiency of the parking brake with respect to the known parking brakes having a self-locking gear speed, this arrangement provides another component in the form of a second drive. This second drive can be moved between a locking position and a position that releases the parking brake. The first drive in this arrangement is free of any self-locking effect.

DE 19 750 420 A1 describes an electrically operable brake for a motor vehicle, which includes a parking device. The parking device has a ratchet wheel, which is connected to a drive for the brake in a rotationally fixed connection. Furthermore, the parking device has two pawls that can be retracted into the ratchet wheel. These pawls can be displaced by means of a motor drive to mechanically lock the ratchet wheel and thus the brake by engagement of the pawls in the ratchet wheel.

Additional prior art is known from the document DE 10 2011 084 190 A1, which discloses an electrically operable motor vehicle brake having a parking brake device. The parking brake device is equipped to keep the motor vehicle brake de-energized in a parking brake position. To do so, a permanent magnet in a rotationally fixed arrangement cooperates with a yoke, which is provided in a drive train of the brake. Permanent magnetic attractive forces thus cause a noncontact rotational locking in the drive train. However, the parking brake device can be stopped by generating a magnetic field directed against the magnetic field of the permanent magnet and thus neutralizes the effect of the permanent magnet.

BRIEF SUMMARY OF THE INVENTION

The feature of the present invention is to provide a motor vehicle brake that can be used both as an operating brake and as a parking brake and has been further optimized with regard to the force flow and the dimensioning in comparison with the state of the art.

This feature is achieved by a motor vehicle brake of the type defined in the introduction, in which it is provided that the self-locking device is integrated into the motor drive.

The invention has the advantage that the entire gear arrangement with its step-up and/or step-down transmission ratios achieved through the gear speeds contained therein can be utilized to reduce the reactive forces originating from the brake linings so that the self-locking device can be dimensioned to be smaller. In addition the inventive arrangement of the self-locking device yields more degrees of freedom at a distance from the threaded spindle in order to design the total motor vehicle brake to have smaller dimensions because the self-locking device can be arranged in a location—namely within the motor drive—where it requires less installation space.

Another advantage of the invention is that the total efficiency of the motor vehicle brake can be improved in comparison with the state of the art, in particular because the gear arrangement or the ball-and-screw spindle drive itself need no longer be designed with the self-locking effect. Efficiencies of significantly more than 50% can therefore be achieved for the transmission of force, which also contributes to the fact that the motor drive can be designed with a lower power consumption, and thus can also be designed with smaller dimensions and a lower power consumption.

According to a preferred embodiment of the invention, the gear arrangement has at least two speeds, preferably three or four speeds. The choice of at least two, preferably three or four speeds makes it possible to achieve a relatively high transmission ratio to the benefit of relatively small dimensions of the motor drive, while nevertheless the displacement mechanism can be designed to be relatively compact. This number of speeds also allows small dimensions for the self-locking device within the motor drive It is preferably provided according to the invention that the self-locking device can be activated and deactivated as a function of the power supply to the motor drive. In other words the self-locking device can be actively deactivated for example when the motor drive is energized. It can then be linked to the motor drive by the circuitry. If the motor drive is no longer receiving power, the self-locking device becomes active and locks the actuator through its self-locking effect to prevent any displacement. This effectively counteracts any unintentional release of the brake.

This can be achieved according to the invention, for example, by the fact that the self-locking device is prestressed by a spring mechanism into a state in which it locks the displacement mechanism with a spring action. Thus through its prestressing effect, the spring mechanism ensures reliable switching of the self-locking device into the locking state.

Furthermore, in this context, it is possible to provide that the self-locking device is equipped with an electromagnet which is activated on energization of the motor drive, and the self-locking device is switched to a non-locking state against the action of the spring mechanism. According to the invention, it is possible for the electromagnet to be integrated into the motor drive. In this variant of the invention, a very compact design can be achieved. Alternatively, the electromagnet may also be set up outside of the motor drive.

According to a preferred refinement of the invention, the self-locking device is arranged in such a way that the reaction forces occurring in locking the displacement mechanism can be derived directly or indirectly into the housing of the actuator or into a housing of the motor drive. This yields an advantageous flow of force, which permits a lightweight design of the housing.

With regard to the structural design, in one embodiment variant of the invention, it is possible to provide that the self-locking device has a brake disc which is coupled to a (output) shaft of the motor drive but supports the armature wherein at least one friction lining is provided for the housing of the actuator or the housing of the motor drive and this friction lining can be brought into interaction with the brake disc to achieve the self-locking effect. In this context it is also possible according to the invention for the (output) shaft to be mounted so that it can be rotated and can be displaced axially wherein the self-locking device can be switched back-and-forth by axial displacement of the (output) shaft between a locking state and a non-locking state depending on the power flow to the motor drive.

According to a preferred embodiment variant of the invention, the gear arrangement has a planetary gear mechanism. Furthermore in this context it may be provided according to the invention that the output shaft has a drive coupling to a sun wheel of the planetary gear mechanism, wherein a hollow wheel of the planetary gear mechanism is arranged in a permanent mount on the housing, and wherein planetary wheels of the planetary gear mechanism are rotationally mounted on a planetary carrier which is itself mounted so it can rotate in the housing.

Other advantages of this invention will become apparent to those skilled in the art from the following detailed description of the preferred embodiments, when read in light of the accompanying drawings.

BRIEF DESCRIPTION OF THE DRAWINGS

FIG. 7a, b show schematic views of a locked state (FIG. 7a) and unlocked state (FIG. 7b) for implementation of one embodiment variant of the invention according to FIG. 6 in which the self-locking device is integrated into the motor drive; and FIG. 8a, b show schematic views of a locked state (FIG. 7a) and of an unlocked state (FIG. 7b) for implementation of an alternative embodiment variant of the invention according to FIG. 6 in which the self-locking device is integrated into the motor drive.

DETAILED DESCRIPTION OF THE INVENTION

Figure 1:
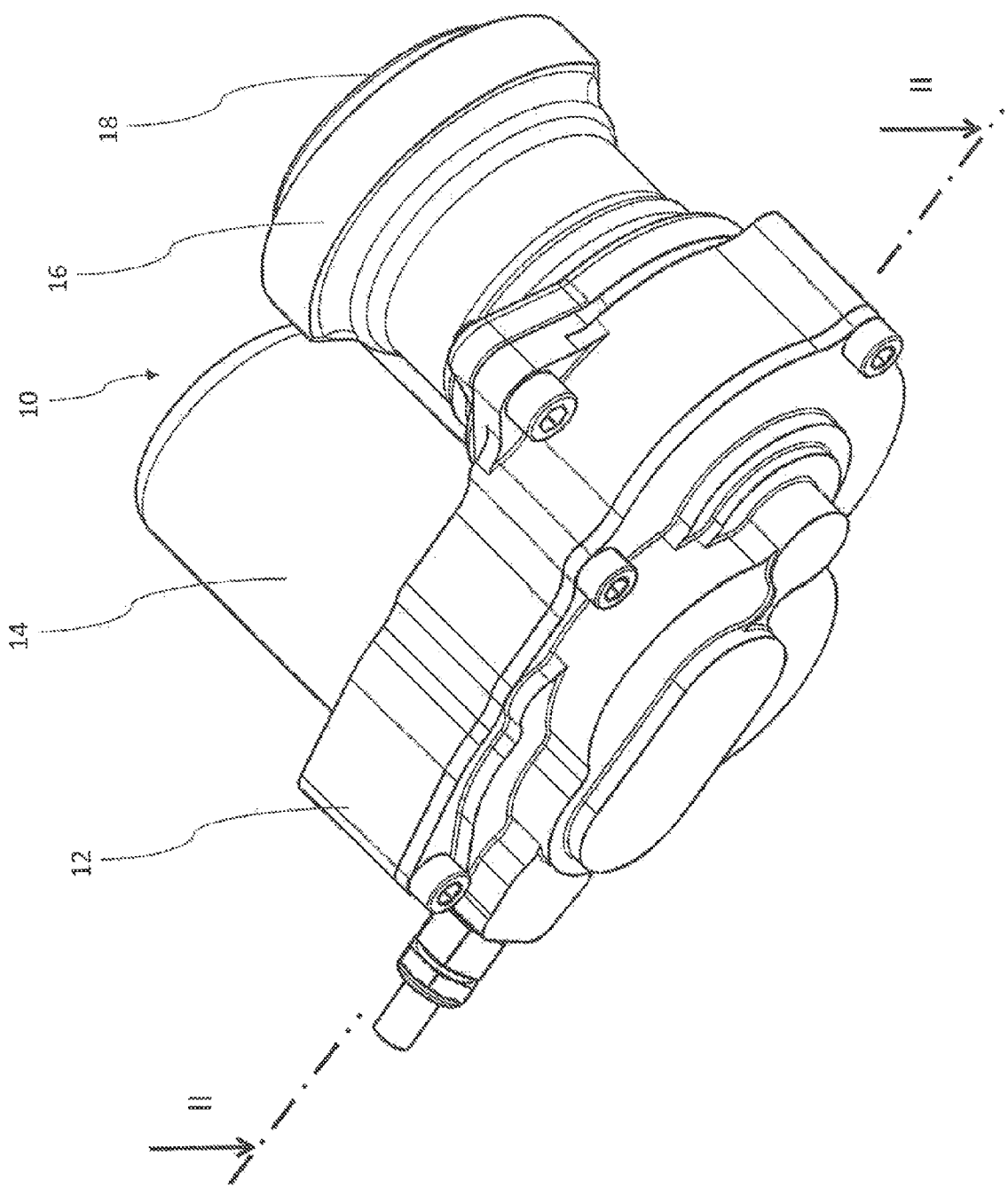
FIG. 1 shows a three-dimensional exterior view of an actuator assembly to illustrate the technical background of the inventive motor vehicle brake.

FIG. 1 shows an actuator assembly of a motor vehicle brake in a three-dimensional diagram, labeled with 10 in general. FIGS. 2 through 5 serve to illustrate the technical background of the invention. The actual exemplary embodiments are described with reference to FIGS. 6 and 7.

FIG. 1 shows a housing 12, in which a gear arrangement is situated as well as a partial housing 14 for accommodating a drive motor and another partial housing 16, in which a displaceable piston 18 is arranged, with which a brake lining (not shown) can be displaced in an active braking manner in a brake unit of a motor vehicle brake. The actuator assembly 10 shown in FIG. 1 of the inventive motor vehicle brake can be installed into a float saddle brake for example in the usual way. Reference is made in this regard to the document WO 2009/046899 A1 which discloses such an installation situation as an example. This document is a patent application by the present patent applicant. The following discussion relates to the actuator assembly consisting of a motor drive and a displacement mechanism for displacement of the brake lining, the following description is concentrated on these components. Only corresponding components are also shown in the figures.

Figure 2:
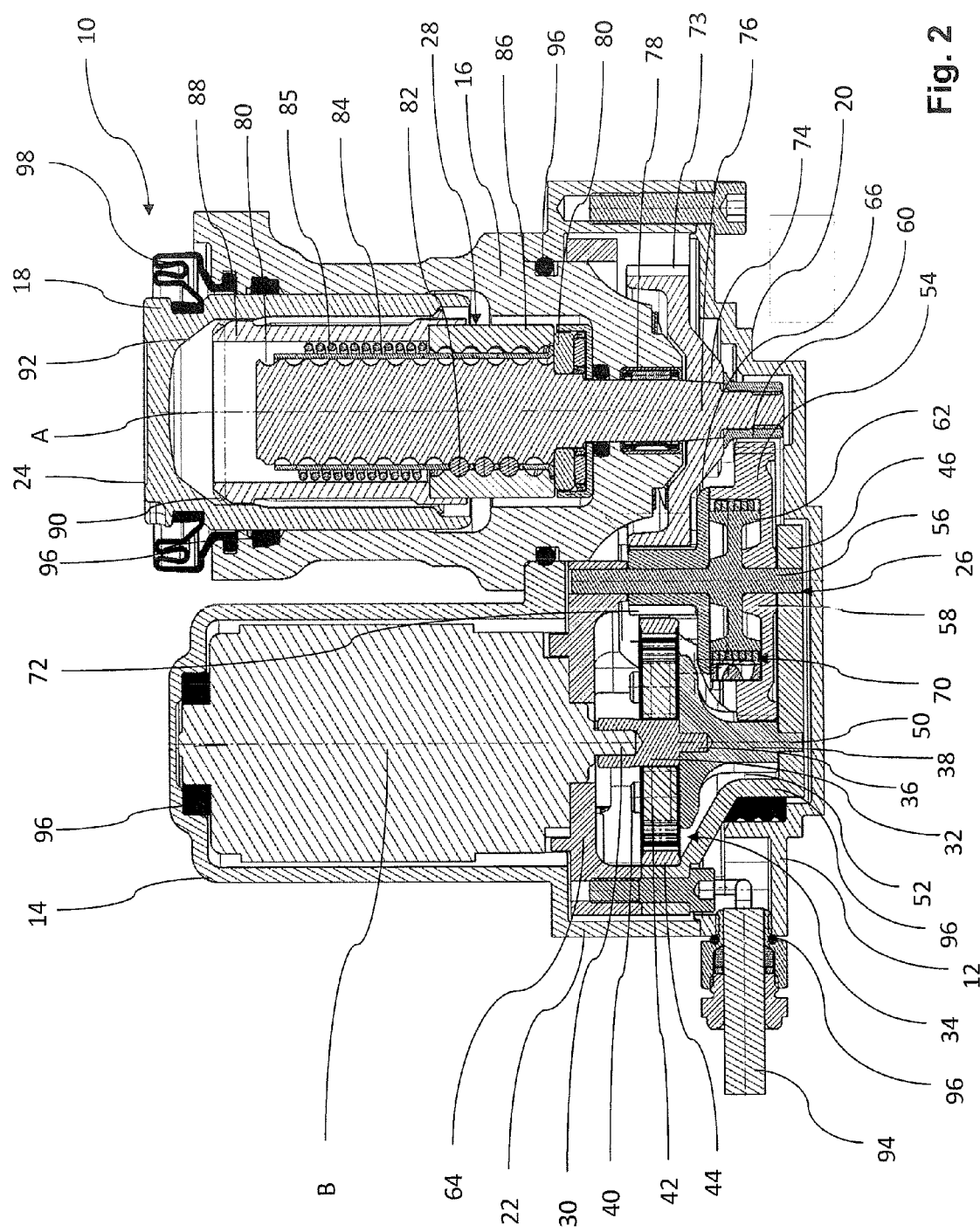
FIG. 2 shows sectional views through an actuator assembly of a motor vehicle brake according to the prior art, including an axle, to illustrate the function principle of such brakes.

FIG. 2 shows a cross-sectional view through the drive unit 10 shown in FIG. 1, the view including an axle. It can be seen here that the housing 12 is designed in multiple parts and consists of a housing cover 20, the partial housing 14 for receiving an electric motor 22 and the partial housing 16 for displaceable accommodation of the piston 18. The piston 18 is hydraulically and electromechanically displaceable along the longitudinal axis A in an essentially known manner. Its exposed surface 24 cooperates in the usual way with a brake lining arrangement (not shown) to achieve a braking effect. A hydraulic displacement takes place in the known way during operational braking. An electromechanical displacement takes place by activating and releasing the parking brake function.

The following discussion goes into detail about the electromechanical displacement mechanism.

The displacement mechanism comprises a gear arrangement 26 and a spindle nut assembly 28. The two basic components of the displacement mechanism are shown in a cutaway view in FIG. 3 together with the electric motor 22. The gear arrangement 26 serves to convert a rotational movement of the electric motor 22 into a corresponding linear movement of the piston 18 along the longitudinal axis A. In detail the electric motor 22 has a motor output shaft 30 extending along the longitudinal axis B of the motor. This output shaft is coupled to a gear wheel 32 in a rotationally fixed manner. The gear wheel 32 serves as a sun wheel of a planetary gear 34. The gear wheel 32 has a bearing journal 36 in its end but is remote from the motor. A planetary carrier 38 is mounted rotatably on this bearing journal 36 and in turn has a plurality of bearing journals 40. The bearing journals 40 serve to support planetary wheels 42 which are in meshing engagement with the gear wheel 32.

A hollow wheel 44 is arranged fixedly on the housing on the outside of the planetary wheels 42 radially. Another housing part 46 serves this purpose. The planetary carrier 38 is rotatably mounted in this housing part 46 with a bearing journal 50. It has external gearing 52 between the bearing journal 40 and its bearing journal 50. This external gearing 52 meshes with a first gear wheel 54 which is rotatably mounted on a stator 56, fixedly mounted on the housing itself, via a bearing section 58 on the inside radially and has external gearing 60 on its outside periphery. The gear wheel 54 is designed in the shape of a pot. In its interior a friction wheel portion 62 which is integrally molded on the stator 56 and therefore is also mounted in the housing 12 in a rotationally fixed manner, in particular being mounted on the housing part 46 and on another housing part 64 in a rotationally fixed manner, for example pressing of this portion extends in the interior of the gear wheel. A second gear wheel 66 is rotatably mounted on the stator 56. This second gear wheel 66 with this type of brake may be coupled to the first gear wheel 54 via a wrap spring clutch 70 for transfer of the torque. This will be discussed in detail below. The second gear wheel 66 has external gearing 72 on its portion facing away from the first gear wheel 54. This gearing meshes with external gearing 73 on an output gear wheel 74 which is supported in a rotationally fixed manner on a spindle 76 of the nut-spindle assembly 28.

It can be seen in FIG. 2 that the spindle 76 is mounted via a radial needle bearing 78 and an axial bearing in the housing part 16. The spindle 76 has on its outer periphery a threaded formation 80 which holds roller bodies 82. The roller bodies 82 are held in a rolling body cage 84 extending over a helical spring 85 into its initial position shown in FIGS. 2 and 3. A nut 86 which executes a linear movement inside the housing part 16 with a rotational movement of the spindle 76 in the usual way is supported on the rolling bodies 82. The nut 86 is fixedly connected to a clutch element 88 which is also displaced accordingly in the movement of the nut 86. The clutch element 88 has a conical clutch surface 90 on its free end. This clutch surface, which can be brought into engagement with a corresponding piston surface 92 in the interior of piston 18 and with the piston 18, can be shifted for displacement of same and thus for displacement of the brake lining (not shown).

Furthermore, connecting cable 94 as well as various gaskets 96 can be seen in FIG. 2 for sealing and/or guiding with a seal the components connecting parts to one another and to the cable. Finally, it remains to be seen that the piston 18 is sealed with a bellows 98.

Figure 3:
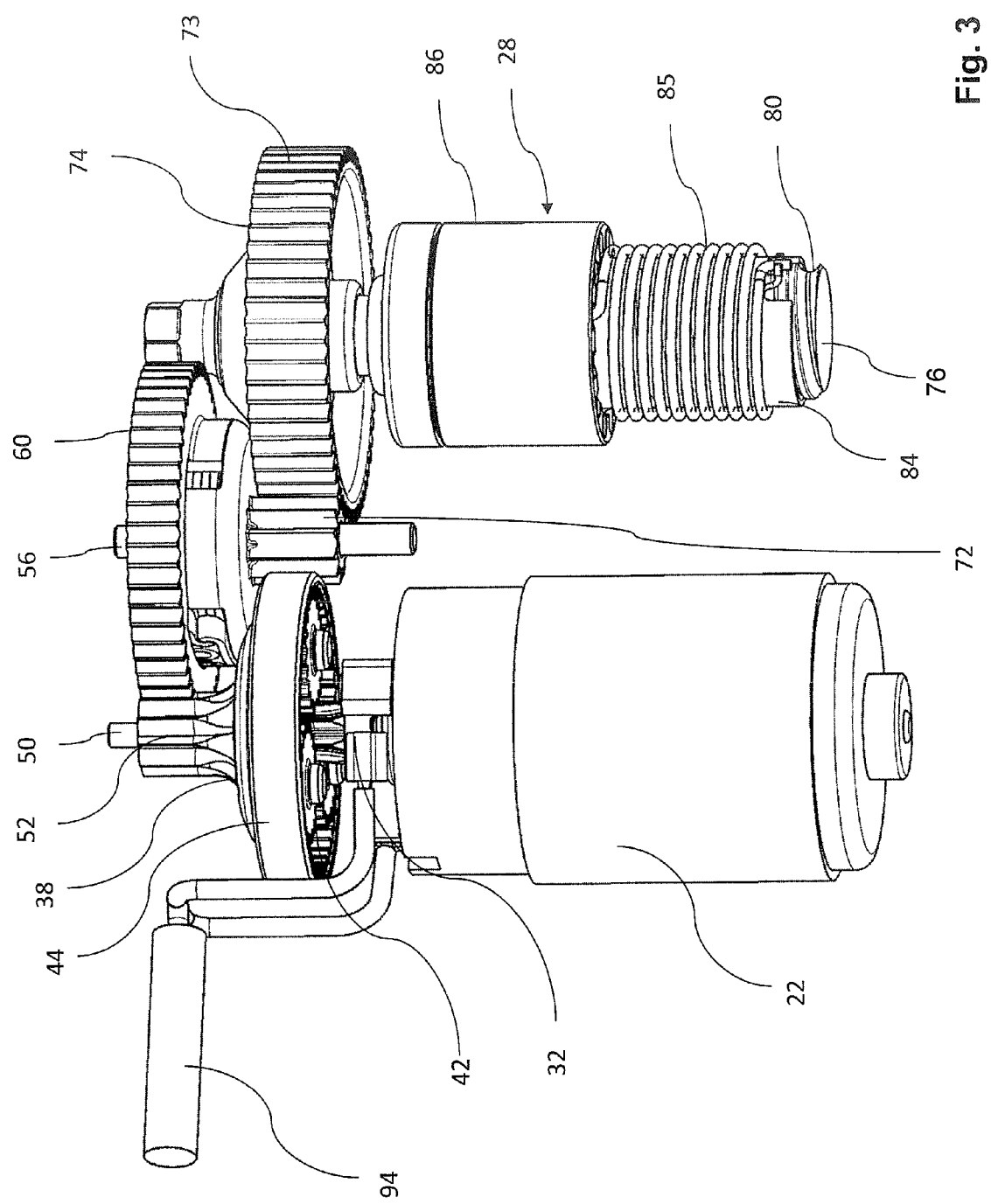
FIG. 3 shows a view of the electric motor, the gear arrangement and the spindle that have been cut free from FIG. 2.

Details of the displacement mechanism can be seen in FIGS. 2 and 3.

Figure 4:
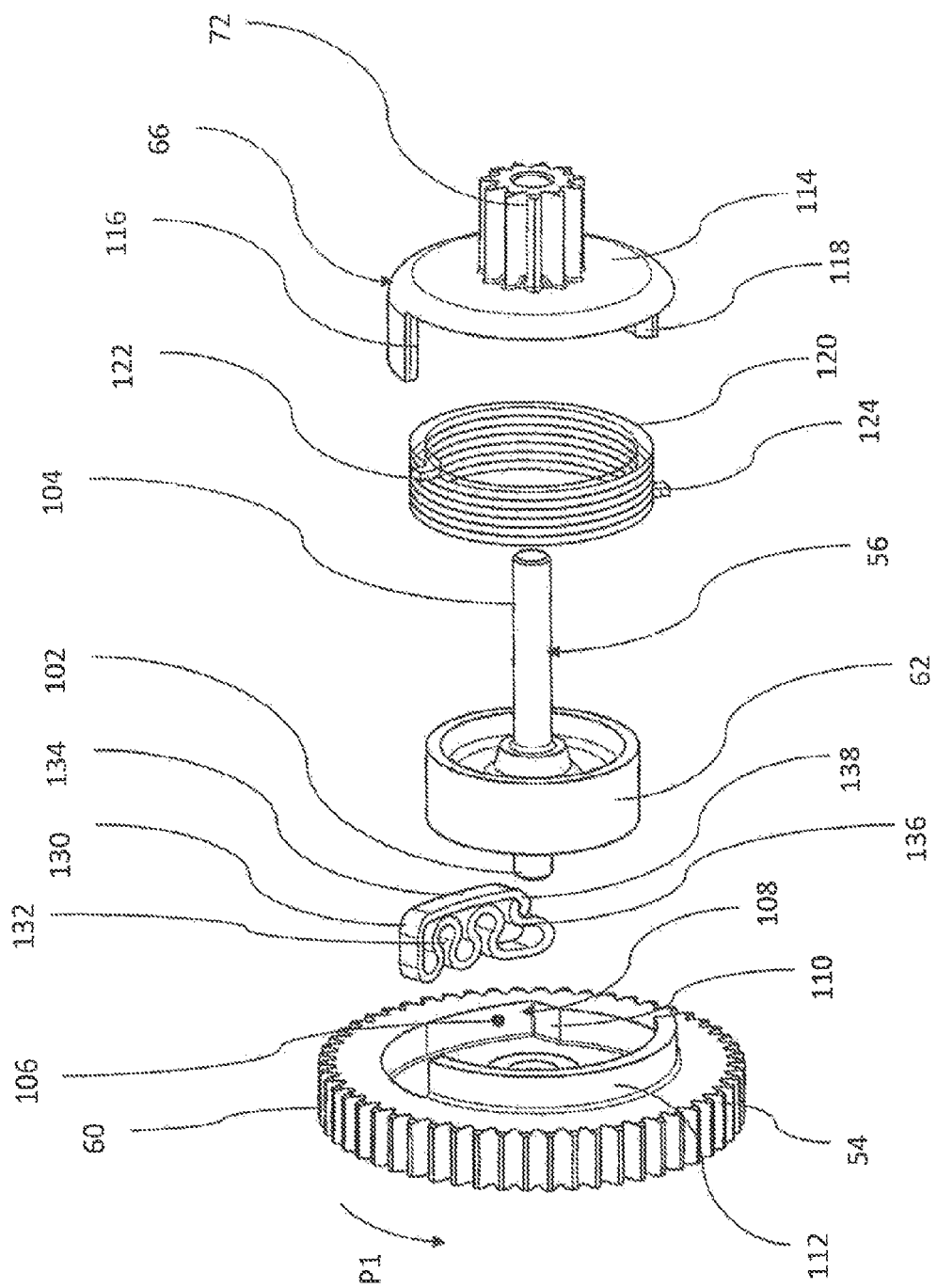
FIG. 4 shows an exploded view to illustrate the wrap spring clutch from FIGS. 2 and 3.
Figure 5:
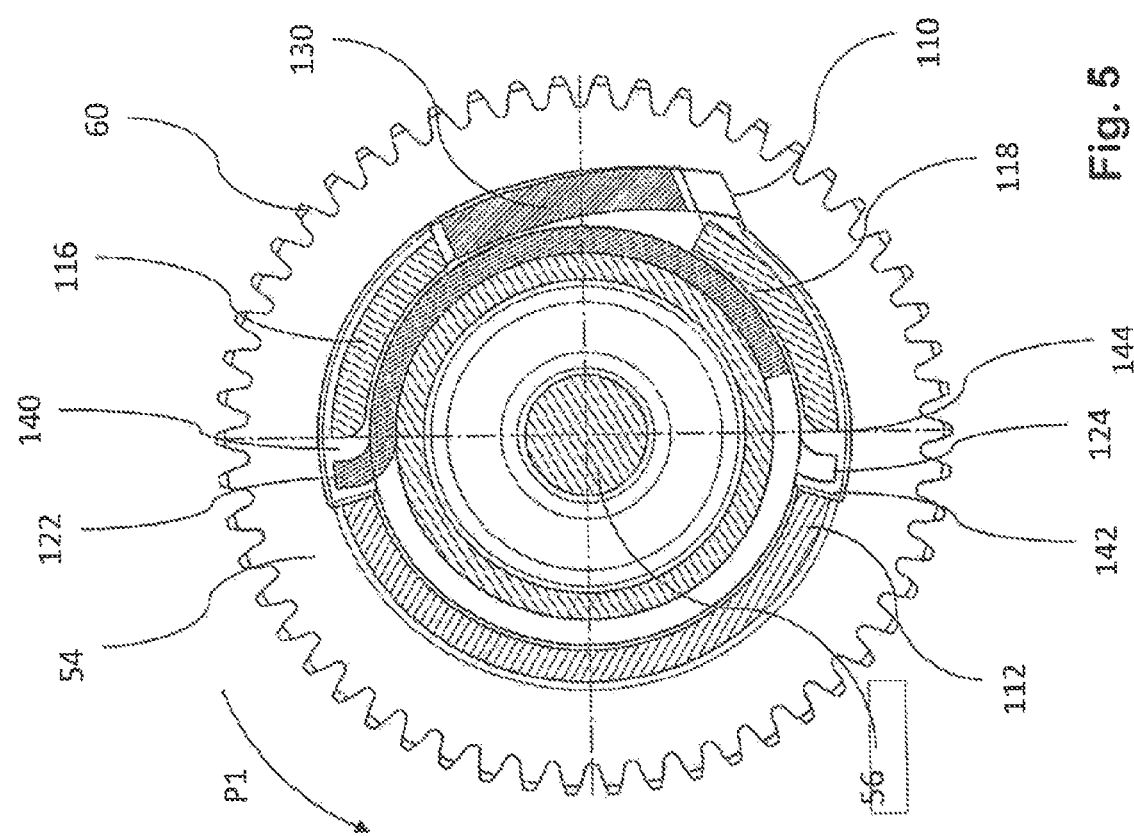
FIG. 5 shows an axially orthogonal sectional view of the arrangement of two gear wheels with a wrap spring clutch according to the brake as illustrated in FIGS. 2 through 4.
Figure 6:
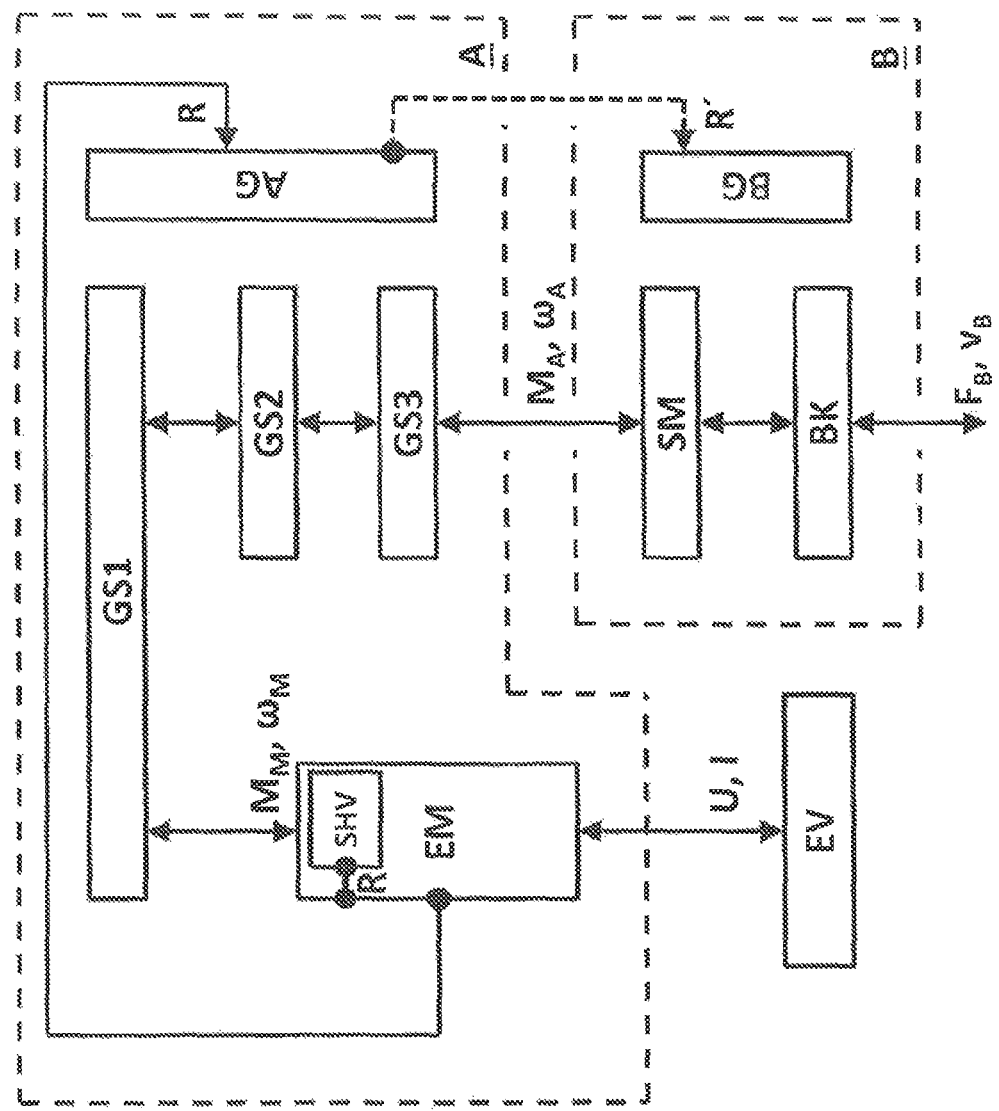
FIG. 6 shows a schematic view from one embodiment variant of the invention in which the self-locking device is integrated into the electromotor drive.

To now turn to FIGS. 4 and 5, the structure and the individual components of the wrap spring clutch 70 can be seen there. In the interior of the wrap spring clutch 70, the stator 56 is provided with its friction wheel portion 62. As already explained, the stator 56 is fixedly mounted on the housing and therefore is mounted by means of two bearing journals 102, 104 in the housing so that it cannot be rotated. At first gear wheel 54 is mounted on the stator 56 and has on its outside circumference the exterior gearing 60 and in its interior is provided with a cavity 106. The cavity 106 is provided with a pocket 108 on the side with a contact surface 110. Furthermore, a pawl 112 in the form of a segment of a circle extends outward from a lateral surface of the first gear wheel 54.

The second gear wheel 66 has, in addition to its external gearing 72, a plate-type structure 114 on which a first pawl 116 and a second pawl 118 are arranged, extending in the axial direction. Furthermore, a helical spring 120 having cropped ends 122 and 124 can be seen in FIG. 4. The helical spring 120 is of such dimensions that it is in tight contact with the outside peripheral surface of the friction wheel portion 62 in the relaxed state but can still slide on it. For assembly, the helical spring 120 is placed on the friction wheel portion 62. This arrangement is accommodated in the cavity 106. The two cropped ends 122 and 124 extend so far outward in the radial direction that they can be brought into engagement with the pawls 112, 116, 118, as will be examined in detail below, without sliding along or scratching the surfaces adjacent to the cavity 106.

Furthermore, FIG. 4 also shows a molded spring 130 having a plurality of coiled loops 132 extending along a base line 134. The two ends 136, 138 engage in one another. The coiled loops 132 can be compressed from their relaxed position into a compressed position under the influence of a force F. The molded spring 130 is arranged in the pocket 108 and its last wrap is in contact with the contact surface 110.

The assembled state of the wrap spring clutch 70 can be seen in FIG. 5, where it should also be pointed out that the cropped spring end 122 is accommodated between the pawl 116 and the pawl 118 in the intermediate space 140.

In general the motor vehicle brake described above with its actuator assembly described above is used primarily for activation of a parking brake function. This means that in the case of operation of the brake, the piston 18 is usually displaced hydraulically in such a way that it is displaced out of the housing parts 16. Likewise it must be possible for the piston 18 to be partially or entirely displaced back into its starting position according to FIG. 2 on release of the motor 22 for release of the brake in the case of operation of the brake. This is usually accomplished solely by the effect of relaxation on the brake lining (not shown) and with the mediation of the restoring spring 85 without requiring a motor drive by electric motor 42. It should be pointed out that, for the case of operation of the brake, relatively low tension forces are required.

In a parking brake situation, the piston 18 is displaced with a relatively great tension force to create a parking brake effect and it should be held in this position consistently in order to park the vehicle reliably. The piston position must absolutely be maintained in order to retain the effect of the parking brake and the piston 18 should be prevented from displacement in reverse over a period of time due to settling processes in the gear arrangement 26. Only when active control takes place by means of the motor 22, thereby actively releasing the parking brake, can the piston 18 be displaced back into its starting position according to FIG. 2.

A distinction must thus be made between the operating brake situations and the parking brake situation wherein depending on the prevailing state of the brake, a transfer of force from the piston 16 to the motor 22 is to be allowed or suppressed, depending on the prevailing status of the brake. To do justice to this requirement, the wrap spring clutch 70 is used in the manner shown here. The wrap spring clutch 70 functions as follows in interaction with the two gear wheels 54 and 66:

First the transfer of force from the gear wheel 54 to the motor side shall be considered, i.e., the case in which the motor 22 is driven and the gear wheel 54 is rotationally driven with the planetary gear 34 in between as a mediator. There are two directions of rotation here, namely the direction of rotation of the gear wheel 54 in the counterclockwise direction for applying tension to the brake (applying tension to the operating brake and the parking brake) and the direction of rotation of the gear wheel 54 in the clockwise direction for active release of the brake (release of the parking brake).

In rotation of the first gear wheel 54 counterclockwise according to arrow P1—this corresponds to a movement for displacement of the piston 18 out of the housing 16, i.e., for activation of the brake via the motor 22 in an operating brake situation and in a parking brake situation—the molded spring 130 is shifted over the contact face 110 toward the pawl 116. The greater the resistance presented by the pawl 116 against such a shifting (i.e., with an increase in the tension forces), the greater is the compression of the molded spring 130. The helical spring 120 remains ineffective during this actuation counterclockwise according to arrow P1 because its spring ends can move freely in the clearance between the pawls 112, 116 and 118 and its slides on the friction wheel portion 62.

The molded spring 130 is compressed to a greater extent when greater tension forces occur, as is the case in activation of the parking brake, when the brake linings must be pressed strongly against the brake disc in activation of the parking brake. When the molded spring 130 is compressed to a greater extent as a result of a rotational according to arrow P1, this means that now the first gear wheel 54 has been displaced relative to the second gear wheel 56, depending on the compression of the molded spring 130. The maximum relative displacement is determined by the fact that the pawl 112 with its end face 142 comes into contact with the pawl 118 and its front end 144, with the cropped end 124 mediating in between. When this state is reached, the molded spring 130 is compressed to the maximum extent and any further rotation of the electric motor 22 by means of the gear arrangement 26 is transmitted to the spindle nut assembly 28 for further application of tension by the parking brake.

Once the parking brake has been put under tension, reactive forces resulting from the tension force then act back on the gear arrangement. These reactive forces, which are transmitted via the spindle nut assembly 28, the output gear wheel 74 and the external gearing 72, the pawls 116, 118, attempt to force the pawls back into their starting position, i.e., move them counterclockwise. However, as soon as the pawl 116 attempts to move back to its starting position, i.e., counterclockwise, it engages with the cropped end 122 of the helical spring 120. As a result of this mutual engagement, the helical spring 120 is tightened around the friction wheel portion 62 with the movement tendency of the pawl 116 in the counterclockwise direction, so that their wraps become constricted and act more strongly on the outside circumference of the friction wheel portion 62. This wrapping of the exterior peripheral surface of the friction wheel portion 62 results in the fact that the helical spring 120 can no longer slide on this exterior peripheral surface but instead becomes locked on it so to speak. Consequently, the pawl 116 cannot be moved back into its starting position. The parking brake remains activated so this rules out a settling operation.

A control of the motor 22 is necessary for releasing the parking brake again. This takes place in such a way that the gear wheel 54 is rotated clockwise. If the gear wheel 54 moves clockwise according to arrow P2—this corresponds to a movement for displacement of piston 18 into the housing 16, i.e., for active release of the brake via the motor in deactivation of the parking brake—then the pawl 112 also moves clockwise accordingly and releases the tension on the molded spring 130. In addition the helical spring 120 is released and releases the pawl 118 which can move back—following the pawl 112—which takes place under the influence of the restoring spring 85.

The wrap spring clutch 70 thus has the general effect that it ensures the parking brake function; that there is a transfer of torque from the motor to the spindle nut assembly even at high tension forces, and that settling effects are unintended release of the parking brake are prevented by the effect of the wrap spring clutch 70 in particular by the effect of the helical spring 120 which is then tightening and acting in a fixed manner on the outer peripheral surface of the friction wheel portion 62.

If the only thing to be implemented is a parking brake function, wherein the activation in the case of an operating brake is purely hydraulic, then the molded spring 130 is one option and may be omitted.

If both an operating brake function and the parking brake function are to be provided with the brake with electromechanical activation, but the molded spring 130 which undergoes deformation to varying extends depending on the prevailing stress state is also to be used in addition. At low tension forces such as those which usually occur during operational braking, the molded spring 130 is not deformed at all or is deformed only to a minor extent so that it so to speak holds the helical spring 120 (wrap spring) inactively so to speak. Therefore a self-locking effect in the gear for the operating brake function can be suppressed. Then a transfer of force through the gear in both directions between the motor drive and the spindle nut assembly are both possible. Only when the molded spring 130 is sufficiently compressed is the helical spring 120 (wrap spring) active in its function so to speak and locking a transfer force through the gear from the spindle nut assembly to the electric motor. The molded spring 130 is thus necessary in the exemplary embodiment shown here because both brake functions—operating brake function and parking brake function—should be provided.

Starting from this understanding for the state of the art according to FIG. 1 through 5, this invention begins with optimization of this specific embodiment. A first exemplary embodiment of the invention is shown schematically in the block schematic according to FIG. 6.

It can be seen here that the electric motor EM which is driven by an electric power source EV delivers a motor torque $M_M$ via an output shaft and delivers it to a first gear speed GS1 of the gear arrangement at a motor angular velocity $\omega_M$. The self-locking device SHV is arranged inside the electric motor EM, i.e., integrated into it. With this device, the reactive forces R on the housing of the electric motor EM can be derived from there to the housing section AG. The gear arrangement comprises, downstream from the gear speed GS1, two additional gear speeds GS2 and GS3. The housing section AG is assigned to the gear arrangement having the individual gear speeds GS1 and GS3 and the electric motor EM. This housing section AG may also be referred to as the actuator housing section AG. The reactive forces R can then be derived through suitable coupling of the actuator housing section AG and the housing section of the brake BG, which is explained in greater detail below, according to the dotted arrow R' to the housing section of the brake BG.

Starting from the gear speed GS3, the torque $M_A$ is transferred with an actuator angular velocity $\omega_A$ to the brake. The brake comprises a spindle nut assembly SM of a ball screw drive and a brake piston BK, starting from which the brake actuating force $F_B$ is transferred at an actuating speed $v_B$ to the brake linings. In the case of braking, reactive forces from this brake piston BK have a reverse effect.

The particular feature of this embodiment is that the self-locking device SHV is set up inside the electric motor so that the three gear speeds GS1, GS2 and GS3 are connected downstream from the self-locking device SHV. This makes it possible to utilize the transmission ratio of all gear speeds GS1, GS2 and GS3 of the gear arrangement as a step-down gear for the reactive forces acting retroactively in a parking brake situation by the brake piston BK, so that the reactive forces which ultimately act on the self-locking device SHV are substantially reduced. Therefore the self-locking device SHV can have relatively small dimensions, which saves on installation space in particular. Furthermore this arrangement of the self-locking device SHV offers freedom in the design and accommodation of the self-locking device SHV inside the electric motor EM.

Exemplary embodiments for implementation of the inventive idea of integration of the self-locking device in the electric motor are shown schematically in FIGS. 7a, 7b and 8a, 8b.

FIG. 7a shows schematically the electric motor EM together with a portion of the gear arrangement, i.e., the first gear speed GS1 inside the actuator housing AG. The electric motor has an armature 150 with a coil winding in an essentially known manner, wherein the armature 150 is mounted on a motor shaft 152 in a rotationally fixed manner. The motor shaft 152 is mounted rotatably in two bearings 154, 156 that are rigidly mounted on the housing, but the motor shaft can be displaced in the axial direction. It is accommodated in a gear wheel 42 of the first gear speed GS1 in a rotationally fixed but axially displaceable manner by means of a torque transmitting profile.

Pole shoes 158 of the stator are arranged around the armature 150 in an essentially known way. An electromagnet 160 which can be energized by an electric circuit 162 having a voltage source 164 and a switch 165. Electromagnet 160 is designed so that it exerts an axial force on the armature 150 while receiving power as will be discussed in detail below. Furthermore, it can be seen that a friction disc or brake disc 166 is mounted on the end of the motor shaft 152 at a distance from the transmission in such a way that it is rotationally fixed. Within the context of its axial mobility, the motor shaft 152 is prestressed downward in FIG. 7a toward the bottom by means of a compressive spring 168. Therefore, the brake disc 166 is pressed against friction bearings 170, 172 with the prestressing force, so that the motor shaft 152 is locked to prevent a rotational movement by the frictional forces occurring due to the spring force between the brake disc 166 and the brake linings 170, 172.

FIG. 7a thus shows the unenergized state of the electromagnet 160 (the switch 165 is open) in which a rotational movement is locked by the spring force-induced frictional forces between the brake disc 166 and the brake linings 170, 172. The self-locking device SHV is thus active.

Now when the switch 165 is placed as shown in FIG. 7b, the electromagnet 160 is energized, so that it exerts an axial force on the armature 156 upward in FIG. 7b, as indicated by the arrow. The axial force exceeds the spring force of the compressive spring 168 and pulls the motor shaft 152 upward in FIG. 7b. The brake disc 166 therefore becomes disengaged from the friction pads 170, 172, so that the motor shaft 152 can rotate freely in the bearings 154, 156. Subsequently, in energization of the electric motor EM, the brake piston BK (FIG. 6) can be displaced into a target position without being hindered. This applies to both achieving a braking force $F_B$ and canceling a braking force.

As soon as the switch 165 has been opened again, the electromagnet 160 is deactivated and the motor shaft 152 is shifted under the influence of the spring 168 into the condition shown in FIG. 7a. This means that the friction disc and/or brake disc 166 is/are again pressed against the friction pads 170, 172, so that movement of the motor and also a restoring movement are locked.

In this embodiment of the invention, a self-locking effect, which can be turned off by means of a switch 165, occurs, so to speak, wherein the self-locking device SHV is switchable in this embodiment and includes these components: switchable electromagnet 160, compression spring 168, brake disc 166 and friction pads 170, 172.

It should be pointed out that the switch 165 can be controlled separately by means of a control unit or can be closed in synchronization with the energization of the electric motor EM.

The embodiment according to FIGS. 8a and 8b shows a similar function like the embodiment according to FIGS. 7a and 7b but it differs in the arrangement of the friction disc and/or brake disc 166 and the friction pads 170, 172 as well as the spring. The brake disc 166 is mounted in a rotationally fixed position on the axial end of the motor output shaft 152, which is close to the transmission. The friction pads 170, 172 are mounted opposite the brake disc 152. The compression spring 168 acts on a shoulder 174 which is fixedly connected to the motor shaft 152 and exerts a compressive force acting upward on the motor shaft 152. In the unenergized state of the electromagnet 160 shown in FIG. 8a, the brake disc 166 is pressed against the friction pads 170, 172 with the bias force of the spring 168, so that the motor shaft 152 is locked to prevent a rotational movement due to the friction forces occurring due to the spring force between the brake disc 166 and the brake linings 170, 172. This is referred to as the self-locking effect.

The electromagnet 160 in this embodiment acts in such a way that, when receiving power, it pulls the motor shaft 152 downward in FIG. 8b against the action of the spring force of the compressive spring 168, as indicated by an error. The locking effect of the brake disc 166, which presses against the friction pads 170, 172, is therefore cancelled, and the arrangement can rotate without any self-locking.

The advantages of the invention thus lie in the placement of the self-locking device SHV inside the motor drive EM and upstream from the gear arrangement with the individual gear speeds GS1 to GS3 relative to the actual components of the brake, namely the screw-ball drive (spindle nut arrangement SM). Due to this arrangement, translation ratios of the entire gear arrangement with its gear speeds GS1 to GS3 can be utilized to advantage to reduce the reactive forces in the self-locking device. Furthermore, this arrangement offers greater variability for saving on installation space. The self-locking device can be arranged as needed and as available on the one or other axial end of the motor shaft 152. The reactive forces are derived directly into the actuator housing by means of the friction pads 170, 172, which is advantageous.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A combined hydraulically and electromechanically operable automotive vehicle brake, with an actuator module, comprising:
   a housing,
   an actuator movable relative to the housing in order to hydraulically or electromechanically move a brake lining,
   a motor drive,
   a moving assembly arranged between the motor drive and the movable actuator,
   a gear arrangement associated with the moving assembly, and
   a separate self-locking device, which is designed to block the moving assembly on demand,
   wherein the moving assembly has a ball screw arrangement with a spindle and a nut, and
   wherein one of the components, the spindle and the nut, is rotatably driven, and the respective other one of the components, the spindle and the nut, is linearly movable for moving the actuator by rotatably driving one of the components, the spindle and the nut inside the housing,
   wherein the self-locking device is integrated into the motor drive; and
   wherein the self-locking device is prestressed by means of a spring mechanism into a state in which the self-locking device blocks a displacement mechanism.

2. The motor vehicle brake according to claim 1, wherein the gear arrangement has at least two gear speeds.

3. The motor vehicle brake according to claim 1, wherein the self-locking device is configured to be activated and deactivated as a function of energization of the motor drive.

4. The motor vehicle brake according to claim 1, wherein the self-locking device is provided with an electromagnet, which is activated on energization of the motor drive and switches the self-locking device into a non-locking state against the action of the spring mechanism.

5. The motor vehicle brake according to claim 4, wherein the electromagnet is integrated into the motor drive.

6. The motor vehicle brake according to claim 1, wherein the self-locking device is disposed in such a way that the reactive forces occurring during the blocking of the displacement mechanism is configured to be derived directly or indirectly into the housing of the actuator or into the housing of the motor drive.

7. A combined hydraulically and electromechanically operable automotive vehicle brake, with an actuator module, comprising:
   a housing,
   an actuator movable relative to the housing in order to hydraulically or electromechanically move a brake lining,
   a motor drive,
   a moving assembly arranged between the motor drive and the movable actuator,
   a gear arrangement associated with the moving assembly, and
   a separate self-locking device, which is designed to block the moving assembly on demand,
   wherein the moving assembly has a ball screw arrangement with a spindle and a nut, and
   wherein one of the components, the spindle and the nut, is rotatably driven, and the respective other one of the components, the spindle and the nut, is linearly movable for moving the actuator by rotatably driving one of the components, the spindle and the nut inside the housing,
   wherein the self-locking device is integrated into the motor drive; and
   wherein an output shaft of the motor drive is mounted rotatably and axially displaceably, wherein the self-locking device can be switched back and forth between a locking state and a non-locking state in accordance with the energization of the motor drive by axial displacement of the output shaft.

8. The motor vehicle brake according to claim 1, wherein the gear arrangement has a planetary gear mechanism.

9. The motor vehicle brake according to claim 8, wherein the motor drive has an output shaft, which is coupled to a sun wheel of the planetary gear mechanism with regard to the drive, a hollow wheel of the planetary gear mechanism being arranged fixedly on the housing, and planetary wheels of the planetary gear mechanism being rotatably mounted on a planetary carrier, which is also rotatably mounted in the housing.

* * * * *